United States Patent [19]
Willhite et al.

[11] 3,878,403
[45] Apr. 15, 1975

[54] LIMIT CIRCUITS
[75] Inventors: Charles C. Willhite, Las Cruces, N. Mex.; George E. Zenk, Dover, N.J.
[73] Assignee: Bell Telephone Laboratories, Incorporated, New York, N.Y.
[22] Filed: July 23, 1959
[21] Appl. No.: 829,145

[52] U.S. Cl. ............... 307/237; 307/230; 330/103; 325/473
[51] Int. Cl. ............................................. H03k 5/08
[58] Field of Search ....... 330/9, 103, 111, 141, 109, 330/96, 138; 235/183; 328/165, 132; 325/473; 307/237, 230

[56] References Cited
UNITED STATES PATENTS
| 639,183 | 6/1950 | Murphy Radio et al. | 325/473 |
| 2,144,995 | 12/1939 | Pulvari-Pulvermacher | 325/473 |
| 2,856,468 | 10/1958 | Berry | 330/9 |

OTHER PUBLICATIONS
GAP/R Electronic Analog Computers, George A. Philbrick Researches, Inc., 285 Columbus Ave., Boston 16, Mass.; "Applications Manual for Philbrick Octal Plug-In Computing Amplifiers," page 12 relied on, Sept. 29, 1958.

*Primary Examiner*—Maynard R. Wilbur
*Assistant Examiner*—S. C. Buczinski
*Attorney, Agent, or Firm*—John K. Mullarney

EXEMPLARY CLAIM

1. A limit circuit comprising an operational amplifier, means coupled to the output of said amplifier for providing a voltage which is a derivative of the output voltage of said amplifier, a diode connected to the input of said amplifier, means coupling a predetermined bias voltage to said diode to maintain the same in a normally nonconductive state, and means coupling said derivative voltage to said diode to place it in a conductive state to thereby deliver a feedback current to the amplifier input whenever said derivative voltage exceeds said bias voltage.

5 Claims, 5 Drawing Figures

INVENTORS: C. C. WILLHITE
G. E. ZENK
BY
John K. Mullarney
ATTORNEY

LIMIT CIRCUITS

This invention relates to limit circuits, and more particularly to a circuit for limiting the derivative of the output voltage of an operational amplifier.

There are instances wherein it is desirable to limit the first derivative, i.e., rate of change, of the output voltage of an operational amplifier. For example, if a radar system is tracking a closely spaced formation of targets, the target tracking data may be highly irregular due to the radar moving or jumping from one target to another. The target position data of the radar is delivered to a gun-fire direction computer which generates voltage analogs of the components of the target velocity. The jumps in the target position data will, therefore, cause large, false, target velocity changes to be generated, and since these abrupt changes are interpreted as target maneuvers by the computer, misdirection of the defensive weapons can occur.

A knowledge of the acceleration capabilities of a target or group of targets yields a knowledge of the maximum rate of change to be expected in target velocity information. Thus, if a group of targets is being tracked, it is highly improbable that the group will execute a maneuver in excess of some given magnitude. Accordingly, any computed target velocity analog with a rate of change exceeding said given magnitude represents false information and should be minimized as much as possible.

It is an object of this invention therefore to limit to a selected value the rate of change of the output voltage of an operational amplifier.

It is a further object of the invention to impose a derivative limit upon the output voltage of an operational amplifier.

In accordance with a preferred embodiment of the present invention, a conventional d-c operational amplifier, e.g., of the copying, differentiating or integrating type, is provided with a rate limit circuit which shunts the normal feedback thereof. The output of the amplifier is differentiated in said limit circuit and applied to a back biased diode which is connected to the amplifier input. When the rate of change of the amplifier output voltage exceeds a preselected critical value, the derivative voltage overcomes the bias applied to said diode causing the same to conduct and deliver an overriding feedback current to the amplifier input.

Essentially the same technique can be used to impose a preselected second, or even higher, derivative limit upon the output voltage of an operational amplifier.

These and other objects and features of the invention may be better understood by a consideration of the following detailed description when read in connection with the accompanying drawing in which.

Figure 1:
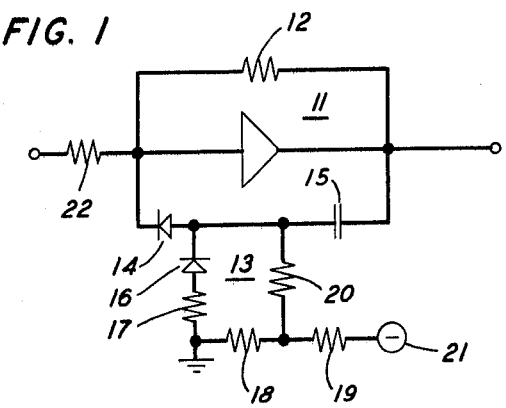
FIG. 1 is a schematic diagram of a conventional operational amplifier and a rate limit circuit therefor in accordance with the present invention.

Referring now to FIG. 1 of the drawing, there is shown therein a conventional, d-c operational amplifier 11 of the copying type. For a given input voltage to the amplifier, the output voltage will be inverted in phase and proportional in magnitude to the ratio of the feedback resistance 12 to input resistance 22. A rate limit circuit 13, in accordance with the invention, is coupled from the amplifier output to the input thereof, in shunt with resistance 12.

The rate circuit comprises a diode 14 having its cathode connected to the amplifier input and its anode directly connected to one of the plates of capacitance 15, the other plate of the latter being connected in turn to the amplifier output. The anode of diode 14 is also connected to ground via diode 16 and resistance 17, connected in series. Resistances 18 and 19 serve as a voltage divider which fractionates the negative, d-c supply voltage 21. The fractionated voltage is applied via resistance 20 to the cathode of diode 16 to forward bias the same. Since the cathode of diode 14 is connected to the grid of the operational amplifier, a point very near ground potential, the diode 14 will accordingly be back biased. The extent of this back bias is determined primarily by the IR drop across resistance 17, since the resistance of diode 16 is quite low in the forward conduction region.

With diode 14 back biased, no rate limiting occurs, and the copying amplifier performs in standard fashion. The output of the amplifier, however, is continuously applied to the limit circuit wherein it is differentiated by an RC circuit which functions in a more or less conventional manner. In this instance the RC circuit consists essentially of resistance 17 and capacitance 15 (the resistance of conducting diode 16 being negligible). Resistances 18, 19 and 20 constitute an equivalent resistance ($R_{eq}$) which shunts the diode 16-resistance 17 series connection, but as will be seen hereinafter this $R_{eq}$ is sufficiently large so as to be disregarded for present purposes. Thus, in addition to the bias applied to diode 14 there will be applied a voltage equivalent to the rate of change of the output voltage of the operational amplifier.

For purposes of explanation, it will be assumed that the differential of the amplifier output voltage is of positive polarity. As will be more evident from the later description of FIG. 3, for a negative differential the supply voltage polarity and forward conduction directions of the diodes are reversed.

The rate limit circuit remains inoperative until such a time that the differentiated (rate of change) voltage overcomes the bias selected for diode 14. At this time, the diode 14 will conduct and deliver an overriding feedback current to the amplifier input. Thus, the gain of the amplifier is greatly reduced for any input signal that would normally produce an amplifier output voltage whose rate of change is greater than some selected critical value.

At the same instant that diode 14 begins conducting, diode 16 is back biased. Hence, the diode 16-resistance 17 series connection is virtually open circuited and effectively eliminated from the rate limit circuit until such a time that said rate of change voltage again falls below the bias selected for diode 14. When this occurs, the circuit reverts to the first-described condition.

During the limiting operation, a fraction of the capacitance current ($I_c$) flows through $R_{eq}$ to ground. The current through $R_{eq}$ will be of a magnitude such as to maintain the anode of diode 14 slightly positive, e.g., +0.3 volts. All of the capacitance current over and above that flowing through $R_{eq}$ is delivered, as previously stated, to the amplifier input to cancel that portion of the input current which initially caused the rate of change of the amplifier output voltage to exceed the value selected therefor.

The rate circuit continues to limit until the capacitance current flow through $R_{eq}$ is insufficient to maintain the anode of diode 14 at a positive potential. The capacitance current ($I_c$) is related to the output ($E_o$) of the amplifier by the expression $I_c = c\ (dE_o/dt)$ and, therefore, when $dE_o/dt$ falls below the preselected critical value, the circuit reverts to the nonlimiting condition. Stated somewhat differently, the rate circuit performs the necessary limiting as long as the rate of change of the voltage that would normally be produced at the amplifier output exceeds said preselected critical value as determined by the bias selected for diode 14.

In one successful embodiment of the invention, the following illustrative parameters were found to be quite satisfactory:

| resistance 12 | 12.5 | megohms |
| --- | --- | --- |
| resistance 22 | 1.0 | megohm |
| capacitance 15 | 5.0 | microfarads |
| resistance 17 | 1.62 | megohms |
| resistance 18 | .0909 | megohms |
| resistance 19 | 3.32 | megohms |
| resistance 20 | 6.64 | megohms |
| supply voltage 21 | −250 | volts |

Using parameters having the above values, a circuit constructed in accordance with FIG. 1 provided rate limiting for all rates of change of amplifier output voltage in excess of two volts per second.

The resistance 17 should be of a moderate to low value. As previously pointed out, before the circuit begins limiting, this resistance in combination with capacitance 15 constitutes the RC differentiating circuit. Thus, for rapid circuit response (or fast recovery) it is necessary that the time constant of the differentiating circuit be moderately short and this in turn implies a moderately small resistance 17.

However, for accurate limiting of the amplifier output voltage, it is essential that the overall circuit exhibit a very long time constant during the limiting operation. To this end, the operational amplifier 11 should have a moderate to high feedback resistance 12 and the higher this resistance the longer said time constant. Also, of equal importance, the resistance to ground in the rate limit feedback circuit should be high. The diode 16 in combination with resistances 18, 19 and 20 satisfies this latter requirement. At the instant diode 14 conducts, diode 16 is back biased and approaches an infinite resistance. The effective limit circuit resistance to ground thence becomes $R_{eq}$ and since this is quite high (approximately 6.64 megohms) a long circuit time constant is assured.

Using circuit parameters having the foregoing values, a circuit constructed in accordance with FIG. 1 exhibited a time constant of approximately thirty seconds during limiting with a recovery time of approximately one-half second. Thus, the seemingly contradictory requirements, of accurate limiting (long circuit time constant) and fast recovery, are both met.

Figure 2A:
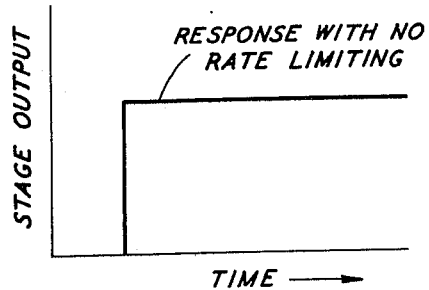
FIGS. 2A and 2B are diagrams useful in explaining the operation of the rate limit circuit of FIG. 1.
Figure 2B:
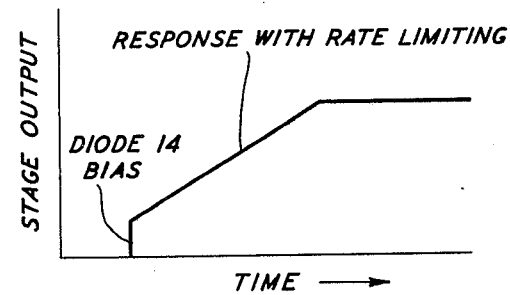

To more readily appreciate the function performed by the limit circuit shown in FIG. 1, reference should be had to FIGS. 2A and 2B. Assuming a negative step voltage applied to the input of the operational amplifier and the absence of a rate limit circuit therefor, a positive step voltage would appear at the output as shown in FIG. 2A. In contrast, FIG. 2B illustrates the results obtained by the addition of a rate limit circuit. Since the limit circuit can have no transmission until the diode 14 conducts, the output voltage initially rises quite sharply. At a preselected critical value, the diode 14 begins to conduct and the rate limiter is thereafter effective. From this point the output will rise to its final value at the limiting rate established by the rate limiter.

While a copying type of operational amplifier has been shown in FIG. 1 for purposes of illustration, it will be clear to those skilled in the art that the invention is equally applicable to other types of operational amplifiers, e.g., differentiating or integrating. A rate limit circuit used in combination with a differentiating type operational amplifier provides, in effect, a second derivative limit upon the input signal voltage. Accordingly, if the input represents target position data, the amplifier output voltage would be "acceleration" limited.

A single amplifier stage has been shown in FIG. 1; however, it will be clear to those skilled in the art that the rate limiter can be placed across any odd number of amplifier stages. All that is necessary, in this regard, is that a negative feedback be provided.

Figure 3:
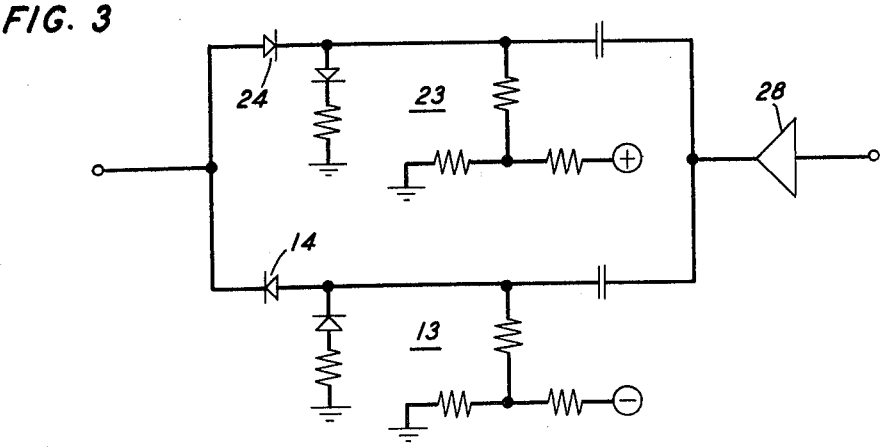
FIG. 3 is a schematic diagram of a rate limit circuit for limiting both positive and negative rates of change.

In FIG. 3 there is shown a rate limit circuit which provides limiting of both positive and negative rates of change. The circuit comprises symmetrical feedback paths 13 and 23 which are identical except for oppositely poled diodes and supply voltages.

As further shown in FIG. 3, the rate limit feedback circuit can include an amplifier 28. This amplifier serves the purpose of increasing the transmission through the rate limiter and permits the use of capacitances of lower value. In this instance, the capacitance current is given by the expression $I_c = c\ G\ (dE_o/dt)$, where G is the gain of amplifier 28. Thus, if the amplifier in the rate limit feedback circuit has a gain of, say, 10, the size of the capacitance (FIG. 1) or capacitances (FIG. 3) can be reduced by a factor of 10.

Figure 4:
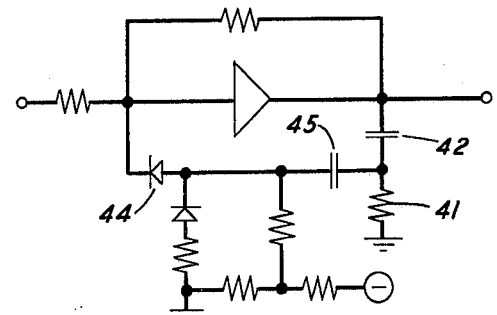
FIG. 4 is a schematic diagram of a second derivative limited operational amplifier in accordance with the present invention.

As illustrated in FIG. 4, essentially the same technique can be utilized to provide a second, or even higher, derivative limit. In the second derivative limit circuit of FIG. 4, the amplifier output voltage is first differentiated in the resistance 41-capacitance 42, RC circuit. The differentiated voltage appearing across resistance 41 is then applied to the capacitance 45. The remainder of this limit circuit is similar to FIG. 1 and it, therefore, functions in similar fashion. Thus, the output of the amplifier is differentiated in the RC circuit comprising resistance 41 and capacitance 42. The first derivative voltage is in turn applied to the capacitance 45 and undergoes another differentiation. When the second derivative voltage exceeds the bias applied to diode 44, an overriding feedback current is delivered to the amplifier input to limit the gain thereof in the above-described manner.

It will be clear to those skilled in the art that by simple extension of the above principles an even higher derivative limit circuit can be provided. Further, by integrating, rather than differentiating, the amplifier output voltage, it is possible to impose an integral limit on the latter. The values listed for the various circuit components are obviously merely illustrative and would in all likelihood be different for other desired operating conditions. Thus, while the present invention has been described by reference to particular embodiments thereof, it will be understood that numerous modifications may be made by those skilled in the art without actually departing from the spirit and scope of the invention.

What is claimed is:

1. A limit circuit comprising an operational amplifier, means coupled to the output of said amplifier for providing a voltage which is a derivative of the output voltage of said amplifier, a diode connected to the input of said amplifier, means coupling a predetermined bias voltage to said diode to maintain the same in a normally nonconductive state, and means coupling said derivative voltage to said diode to place it in a conductive state to thereby deliver a feedback current to the amplifier input whenever said derivative voltage exceeds said bias voltage.

2. A limit circuit as defined in claim 1 wherein the first recited means provides a voltage which is equivalent to the second derivative of the output voltage of said amplifier.

3. A limit circuit comprising an operational amplifier, means coupled to the output of said amplifier for providing a voltage which is equivalent to the rate of change of the output voltage of said amplifier, a diode connected to the input of said amplifier, means coupling a selected bias voltage to said diode to maintain the same in a normally non-conductive state, and means coupling said rate of change voltage to said diode to place it in a conductive state so as to pass a negative feedback current to the amplifier input whenever said rate of change voltage exceeds said bias voltage.

4. In combination with an operational amplifier, a limit circuit comprising a capacitance, means coupling said capacitance to the output of said amplifier, said capacitance being further connected to the input of said amplifier by means of a first diode, a second diode having one electrode connected to the junction of said capacitance and first diode and the other electrode connected to ground through a resistance, and resistance means coupling a voltage of predetermined magnitude and polarity to said junction, said diodes being poled such that said voltage serves to back bias said first diode and forward bias said second diode, whereby the output of said amplifier is differentiated in said limit circuit and an overriding feedback current is delivered to the input of said amplifier whenever the differentiated signal exceeds the back bias applied to said first diode.

5. A circuit as defined in claim 4 wherein said resistance means comprises a resistance which is substantially larger than the resistance coupling said second diode to ground.

* * * * *